United States Patent
Kaneko et al.

[11] Patent Number: 5,485,065
[45] Date of Patent: Jan. 16, 1996

[54] POSITION COMMANDING METHOD AND APPARATUS

[75] Inventors: Akira Kaneko; Norikazu Iguchi; Takahiro Hayashida; Torao Takeshita; Yoshio Shinohara, all of Aichi, Japan

[73] Assignee: Mitsubishi Denki Kabushiki Kaisha, Tokyo, Japan

[21] Appl. No.: 221,572

[22] Filed: Apr. 1, 1994

[30] Foreign Application Priority Data

Apr. 1, 1993 [JP] Japan ................................. 5-075824

[51] Int. Cl.$^6$ .................................................. H02P 1/00
[52] U.S. Cl. ..................... 318/270; 318/569; 318/611; 318/717; 318/276
[58] Field of Search ................................. 318/569, 611, 318/717, 270, 276, 265, 266

[56] References Cited

U.S. PATENT DOCUMENTS

| | | | |
|---|---|---|---|
| 3,749,996 | 7/1973 | Pomella et al. | 318/569 |
| 4,414,496 | 11/1983 | Watanabe et al. | 318/611 |
| 4,558,265 | 12/1985 | Hayashida et al. | 318/611 |
| 5,202,611 | 4/1993 | Uehara et al. | 318/611 |

FOREIGN PATENT DOCUMENTS

| | | |
|---|---|---|
| 0066673 | 12/1982 | European Pat. Off. . |
| 0132353 | 1/1985 | European Pat. Off. . |
| 0202043 | 11/1986 | European Pat. Off. . |
| 2125579 | 3/1984 | United Kingdom . |
| 81/01833 | 7/1981 | WIPO . |

*Primary Examiner*—William M. Shoop, Jr.
*Assistant Examiner*—Karen Masih
*Attorney, Agent, or Firm*—Sughrue, Mion, Zinn, Macpeak & Seas

[57] ABSTRACT

A position command method and apparatus for shortening the acceleration and deceleration times of a servo controlled apparatus by effectively utilizing the torque of the controlled apparatus. A value of speed per unit time is developed on the basis of speed and position data, and a constant speed or an acceleration or deceleration function processing may be selectably performed. In the position commanding method and its unit of the present invention, the deceleration stop distance of output speed is computed at all times or is held as a list data as described above and moreover is compared with a residual distance XR. Consequently, the deceleration stop distance does not have to coincide with the residual portion from the acceleration command, and the acceleration/deceleration curve alone can be realized in an independent form. Also, the speed change can be made smoother by correcting the cross point of independently formed acceleration and/or deceleration curves defining a corner section.

21 Claims, 11 Drawing Sheets

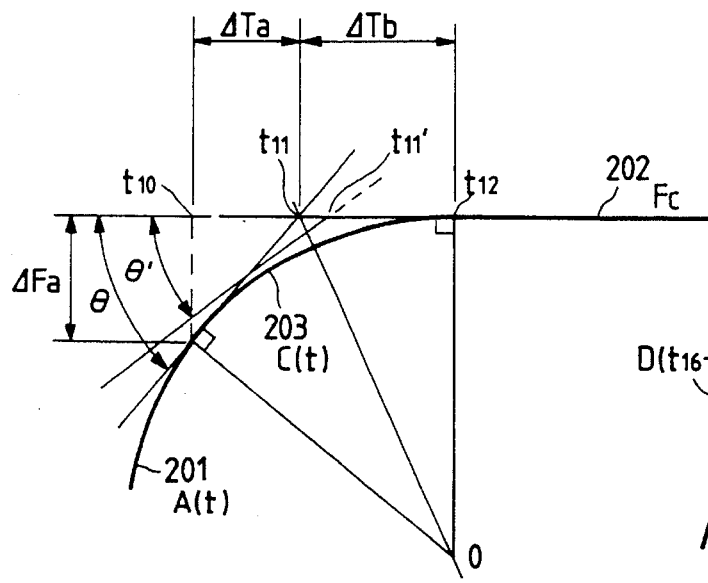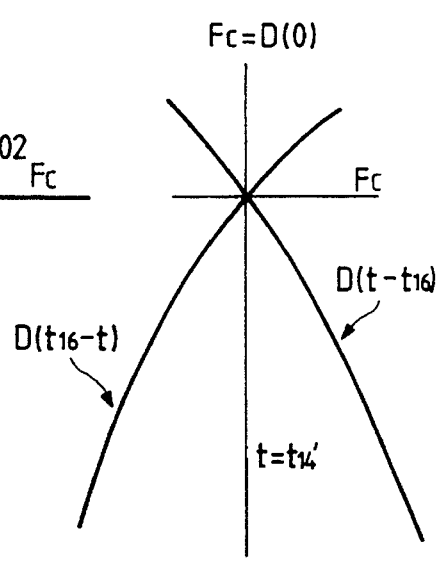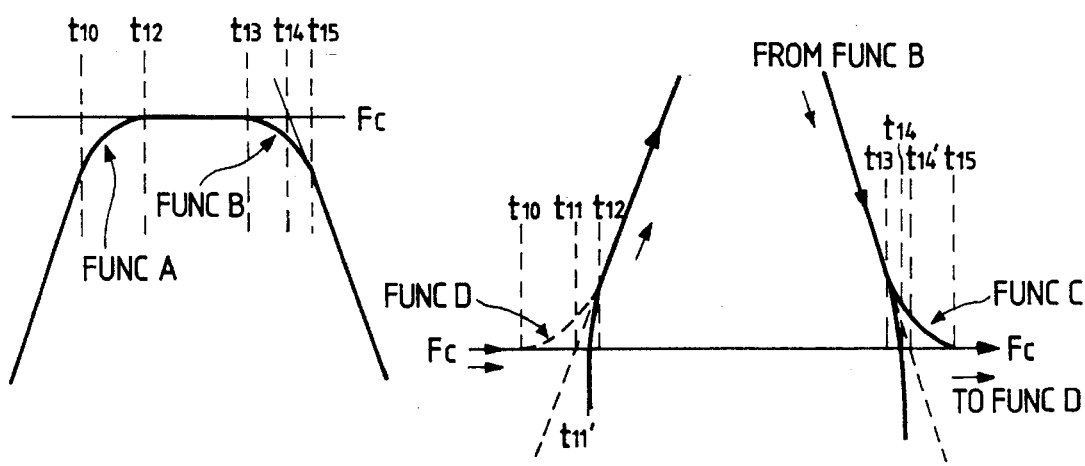

POSITION COMMANDING METHOD AND APPARATUS

BACKGROUND OF THE INVENTION

1. Field of the Invention

The present invention relates to a position commanding method and apparatus for implementing such method for the position control of servo motors, spindle motors, etc., which are the drive sources for machine tools and the like. In particular, the invention relates to a position commanding method and apparatus for shortening the acceleration or deceleration time by maximally utilizing the torque provided by a controlled body.

The present invention may be explained using, for example, a servo motor as a controlled body for the convenience of explanation.

2. Description of the Background Art

FIG. 11 is a block diagram showing the conventional position commanding unit of a servo motor. In this figure there is a program 101 where the position data, speed data, etc., are designated, a data processing section 102 for rewriting and outputting the position data, speed data, etc., from the program 101, a unit time speed command generating section 103 (hereinafter to be called "FΔt generating section") for converting the input speed data into the travel distance at every unit time for its output, and an acceleration/deceleration controlling section 104 consisting of a filter and the like for outputting the output speeds of acceleration, constant speed and deceleration. The output speed Fv from the acceleration/deceleration controlling section 104 converted into the position command via an integrator 107 and drives the servo motor by an amplifier not shown in drawing. Further, there is a 1-block data completion discriminating section 105 for making a judgement to see if the output of 1-block data has been completed from the FΔt generating section 103 and if the next block data is to be read in, and a storing section 106 for parameters that will become a basis for determining if the read data may be rewritten or not on the basis of the discrimination at the 1-block data completion discriminating section 105. In particular, storing section 106 stores the threshold value of the output speed Fv being output from the acceleration/deceleration speed controlling section 104.

Next, the actuation of the unit shown in FIG. 11 is to be described. FIG. 12 is a flow chart explaining the actuation of a conventional position commanding unit illustrated in FIG. 11. Initially, after a START, 1-block data, comprising speed data Fi and position data Xi, is read. Then, the unit will make a decision (S102) to see if the previously read data may be rewritten for the position data Xi and speed data Fi at the i-th block that previously were read into the data processing section 102. When the output speed Fv being output from the acceleration/deceleration controlling section 104 has reached the stipulated value set into the parameter storing section 106, the data processing section 102 rewrites the output speed to a newly read data. At step S102, the data processing section makes a judgement to see if the stipulated value has been set into the parameter storing section 106, and if so set, makes a check to see if the output speed can satisfy its preset value, for example 0 at S103. If the preset value is satisfied, then the step shifts to S104 to rewrite the data; and if it is not satisfied, the processing goes to step S106, as subsequently described. If the stipulated value has not been set at S102, the processing proceeds directly to S104 to rewrite the data.

In step S104, the number of repetitions to output the unit command for obtaining the value Xi is computed by using the equation Xi=ΣFij Δt (however, j is the number of cycles for outputting the unit command) from the sampling time (sampling period, unit time) Δt, and determines the number of cycles j. S105 initially sets j to 0 and the residual distance XR to Xi. S106 outputs the travel distance Fij Δt at every unit time from the F Δt generating section 103. In response to step S106, the output speed Fv is output (S107) as an acceleration, constant speed or deceleration command at the acceleration/deceleration control section 104 by this travel distance, and this output speed Fv drives not only the servo motor via the amplifier as the position command through the integrator but is also returned to S102. On the other hand, in response to step S106, step S108 subtracts the accumulated value of output FijΔt from the residual distance XR, namely, from the distance until the servo motor stops since the command of output speed has disappeared. Then, step S109 makes a judgement to see if the residual distance XR has become zero or not, and if the distance has not been zero, the step adds +1 to j so that the FijΔt may be output, and returns to S106. If the residual distance proves to be 0 at S109, the data processing of 1 block is ended. If there exists the next data at this time, the step returns to START and the above mentioned steps are repeated. All the processing other than those at steps S106 and S107 are done at the data processing section 102.

FIGS. 13(a)–(c) are views showing the general speed pattern in the background art. FIG. 13(b) shows that the servo motor is accelerated until the time t2 by the command FiΔt being output from the FΔt generating section 103, which is shown in FIG. 13(a). Thereafter the motor is driven at a constant speed Fi until the time t1, and then is decelerated because the command of output speed disappears at the time t1.

The time t1 is the point of time when all the commands corresponding to the position data Xi, that has presently been read in, is judged by a 1-block data completion discriminating section 105. Section 105 outputs the command for reading the next data to the data processing section 102. Section 102, in turn, reads the next block of data Xi+1 and Fi+1 on the basis of this command, compares the conditions of output speed stored into the parameter storing section 106 with the output speed, and rewrites the data if the conditions have been satisfied.

The speed pattern shown in FIG. 13(b) drives the servo motor with a constant torque T1 as given in the torque speed characteristics shown in FIG. 13(c). Therefore, though the servo motor itself has the ability capable of generating the torque higher than Torque T1 at the command speed lower than Fi, it can be seen that this ability has not been utilized. In other words, the shaded area in FIG. 13(c) shows the ability which has not been utilized by the servo motor.

For this reason, a variety of proposals for effectively utilizing the torque available from the servo motor at the speed lower than the command speed Fi have been presented in the past.

FIG. 14 shows the torque revolution (speed) characteristics disclosed in Unexamined Patent Publication (Kokai) No. 3-117514, where the torque is subdivided into 3 regions for determining the constant torque corresponding to the command speed with the torque as the function of speed. This approach more effectively utilizes the torque than the conventional method, which provides a drive at a constant torque in response to the rated speed, but still does not utilize the torque sufficiently at the number of revolutions lower than the command revolution number S1.

FIG. 15 illustrates the torque revolution (speed) characteristics disclosed in Unexamined Patent Publication (Kokai) No. 64-72206. The reference discloses the concept that drives in synchronism the servo motor and spindle motor at the limit torque of L1 and L2 spindle motors in the synchronous operation of spindle motor and servo motor, but its concrete method has not been disclosed.

The position commanding unit of a controlled body, such as the conventional servo motor, etc., is structured and actuates as described above, but involves such a problem of not being able to fully utilize the torque being generated by a controlled body such as a servo motor and so forth in any of the cases. The present invention is to solve this problem.

SUMMARY OF THE INVENTION

The present invention is operative to obtain a deceleration stop distance corresponding to the output speed and a residual distance up to a stop on the basis of position data, and to decelerate the controlled body using a deceleration function corresponding to the output speed on the basis of a coincidence signal indicating the coincidence of the deceleration stop distance with the residual distance.

The present invention is also operative to adjust the command speed so as to cause the existence of the relation:

Command speed ≠ (Residual distance − Deceleration stop distance)/Sampling period when there exists the relation of Command speed = (Residual distance − Deceleration stop distance)/sampling period.

The invention is further operative to divide the speed region into a plurality of regions, allocating a straight line torque having a different slope in each of the speed regions, to prepare a speed—torque curve where the torques of adjacent speed regions may become identical to each other, and to acceleration-control and deceleration-control a controlled body along the speed—torque curve until the controlled body reaches a command speed.

In accordance with the present invention, a unit command speed generating means is operative to generate at every unit time the command speed by the speed data and the position data, an acceleration/deceleration controlling means is operative to obtain the output of acceleration, deceleration or constant speed responsive to a command speed and has a function storing section for storing a plurality of acceleration functions and deceleration functions corresponding to the output speeds and a switching section for selecting any of an acceleration function, deceleration function or constant speed, a deceleration position discriminating means for computing the deceleration stop distance responsive to the output speed and the residual distance up to the stop on the basis of the position data and for outputting a coincidence signal when the deceleration stop distance has coincided with the residual distance, and a controlled body decelerating means for decelerating the controlled body using the deceleration function of the acceleration/deceleration controlling means on the basis of the coincidence signal of the deceleration position discriminating means.

In a further embodiment, there is a unit command speed generating means for generating at every unit time the command speed by a speed data and a position data, an acceleration/deceleration controlling means for obtaining the output speeds of acceleration, deceleration or constant speed responsive to the command speed and having a function storing section for storing a plurality of acceleration functions and deceleration functions corresponding to the output speeds and a switching section for selecting any of the acceleration function, deceleration function or constant speed, a deceleration position discriminating means for computing a deceleration stop distance corresponding to the output speed and a residual distance up to a stop on the basis of the position data and for outputting a coincidence signal when the deceleration stop distance has coincided with the residual distance, and a data processing section not only for rewriting the speed data and position data into the next speed data and position data but also for controlling the switching section of the acceleration/deceleration controlling means using the rewritten speed data and position data as the command speeds on the basis of the coincidence signal of the deceleration position discriminating means.

A further feature involves dividing the service speed range on the deceleration torque characteristic line of a controlled body into a plurality of regions, making the deceleration torque characteristics corresponding to each of said regions to be a straight line and obtaining the deceleration torque characteristics which become a continuous broken line throughout the service speed range.

Another feature involves dividing the service speed range on the deceleration torque characteristic line of controlled body into a plurality of regions, wherein the high speed region on the deceleration torque characteristic line may obtain the deceleration torque characteristics of hyperbola.

A further feature of the invention is a position commanding method for generating the control command of controlled body by the difference between the command speed at every unit time to be obtained from a speed data and a position data and the output speeds of acceleration, deceleration or constant speed to be obtained responsive to said command speed, which is for obtaining the first stipulated point before reaching the cross point of characteristic lines consisting of any of two combinations out of the respective speeds of said acceleration, deceleration and constant speed and the second stipulated point which has passed said cross point and for obtaining a correction function of speed change between said first stipulated point and said second stipulated point.

The final feature involves a unit command speed generating means having a corner correction function processing means for correcting the speed change at the cross point of acceleration/deceleration functions consisting of a plurality, e.g., two and/or three, combinations of acceleration function, deceleration function or constant speed, an addition means for adding the output of the acceleration/deceleration controlling means to the output of said corner correction function processing means, a deceleration position discriminating means for computing a deceleration stop distance corresponding to the output speed and the residual distance up to a stop on the basis of the position data and for outputting a coincidence signal when the deceleration stop distance has coincided with said residual distance, and a controlled body decelerating means for decelerating the controlled body using the deceleration function of the acceleration/deceleration controlling means on the basis of the coincidence signal of said deceleration position discriminating means.

BRIEF DESCRIPTION OF THE DRAWINGS

FIG. 9(a) to 9(d) are views explaining the computation method of corner correction function in one preferred embodiment of this invention.

DESCRIPTION OF THE PREFERRED EMBODIMENTS

Figure 1:
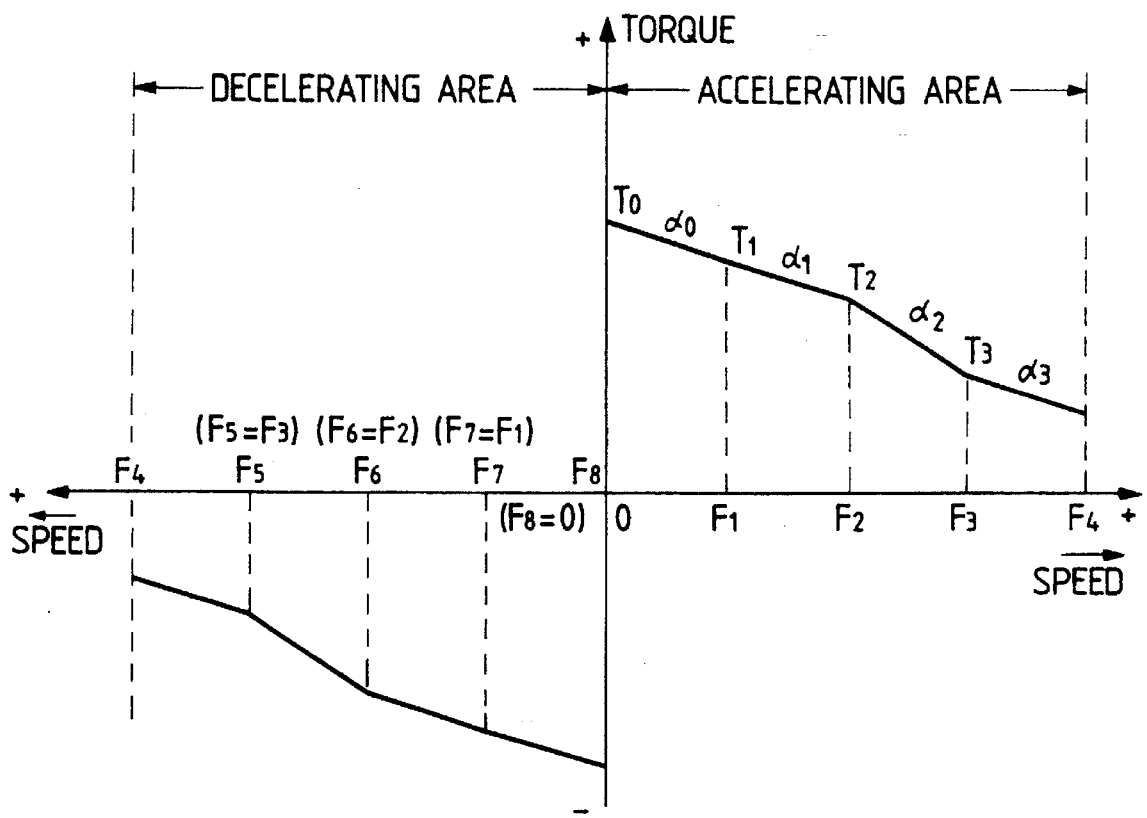
FIG. 1 is a view showing a torque/speed curve to be applied to one preferred embodiment of this invention.

The position commanding method in the present invention decelerates the controlled body using the deceleration function corresponding to the output speed on the basis of the coincidence signal generated when the deceleration stop distance equals the residual distance.

The position commanding method comprising the present invention adjusts the command speed and provides for the coincidence of the deceleration stop distance with the residual distance when there exists the relation of:

Command speed≠(Residual distance−Deceleration stop distance)/Sampling period.

The position commanding method comprising the present invention is for allocating a straight line torque having a different slope in the speed region which has been divided into a plurality of regions, for preparing a speed—torque curve where the torques of adjacent speed regions may become identical to each other, and for acceleration- and deceleration-controlling the controlled body along the speed—torque curve until the controlled body reaches the command speed.

The position commanding unit in accordance with the present invention decelerates the controlled body using the deceleration function corresponding to the output speed on the basis of the coincidence signal of deceleration stop distance with residual distance.

The switching section of an acceleration/deceleration controlling means in the present invention selects any of an acceleration function, a deceleration function or a constant speed, and the deceleration position discriminating means computes the deceleration stop distance corresponding to the output speed and the residual distance up to the stop and outputs a coincidence signal when the deceleration stop distance has coincided with the residual distance. Further, the data processing section not only rewrites the speed data and position data into the next speed data and position data but also controls the switching section of the acceleration/deceleration controlling means using the rewritten speed data and position data as the command speeds on the basis of the coincidence signal of a deceleration position discriminating means.

The position commanding unit in accordance with the present invention divides the service speed range on the acceleration/deceleration torque characteristic line of controlled body into a plurality of regions, makes the acceleration/deceleration torque characteristics corresponding to each of said regions to be a straight line and obtains the acceleration/deceleration torque characteristics which become a continuous broken line (polyline) throughout said service speed range.

The position commanding unit in accordance with the present invention divides the service speed range on the acceleration/deceleration torque characteristic line of controlled body into a plurality of regions, wherein the high speed section on the acceleration/deceleration torque characteristic line obtains the acceleration/deceleration torque characteristics of hyperbola.

The position commanding unit in accordance with the present invention corrects the speed change at the cross point of acceleration/deceleration characteristic lines consisting of two and/or three combinations of the speeds of acceleration, deceleration and constant speed.

The corner correction function processing means in the further feature of the present invention corrects the speed change at the cross point of acceleration/deceleration functions consisting of two and/or three combinations of acceleration function, deceleration function or constant speed. Further, the addition means adds the output of acceleration/deceleration controlling means to the output of corner correction function processing means. In addition, the controlled body decelerating means decelerates the controlled body using the deceleration function of acceleration/deceleration controlling means on the basis of the coincidence signal of a deceleration position discriminating means.

FIG. 1 shows a torque/speed curve, wherein a plurality of speed regions (4 regions in the figure) are provided. Each of these regions is bounded by a straight line having a slope $\alpha L$ (L=0, 1, 2 . . . ). Each of the respective torque/speed curve lines bounding a speed region may be expressed by the following equation:

$$W\ dF/dt = TL - \alpha L(F - FL) \tag{1}$$

(where W: Inatia of rotary section, F: Speed, T: Torque, t: Time).

$$\alpha L = -\{(T(L+1) - T(L))\}/\{(F(L+1) - F(L))\}$$

Figure 2:
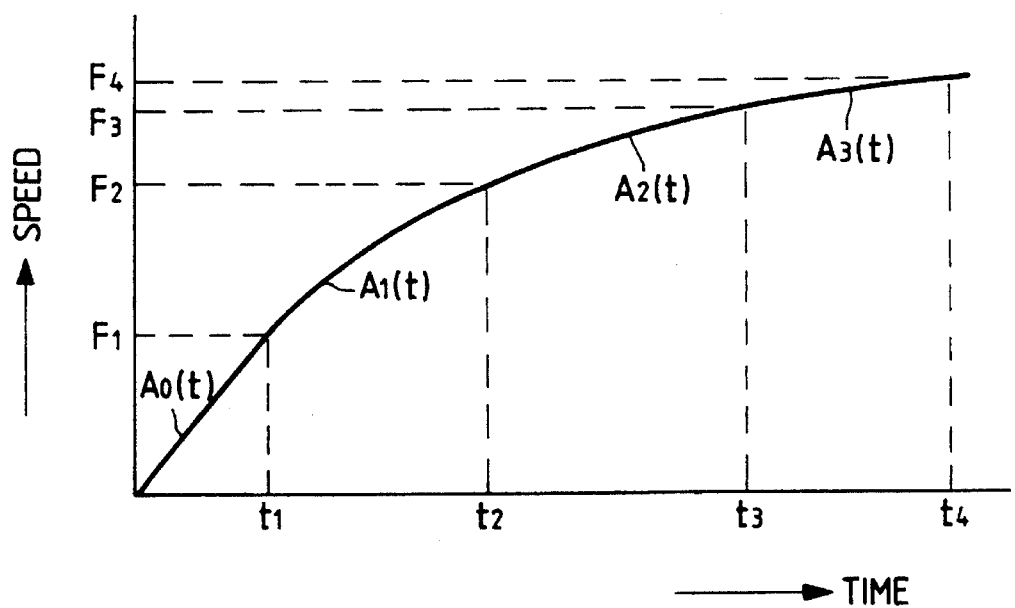
FIG. 2 is a view showing an acceleration function in a plurality of speed regions for explaining one preferred embodiment of this invention.

The speed F can be computed by solving this equation, and an acceleration function AL(t) can also be determined. The acceleration function AL(t) is expressed by the following equation:

$$AL(t) = F = FL + TL \cdot [1 - \exp(-\alpha L(t - t1)/W)]/\alpha L \quad (2)$$
$$(\alpha L > 0)$$

which can be shown by FIG. 2.

Further, a deceleration function DL(t) is a reverse mode to the acceleration function AL(t), both of which change as a function of time. The deceleration function DL(t) may be expressed by the following equation, in which as torque should be negative polarity at decelerating situation, torque is expressed by an absolute value |TL|:

$$DL(t) = FL - |TL| - 1) * [1 - \exp(-|\alpha L|(t - tL)/|\alpha L|)] \quad (3)$$

$$\alpha L = \{(-|T(L+1)|) - (-|TL|)\}/\{F(L+1) - FL\}$$
$$= -\{|TL| - |T(L+1)|\}/\{F(L+1) - FL\} = -|\alpha L|$$

$$(\alpha L < 0)$$

The acceleration functions and deceleration functions illustrated in FIG. 2 can be represented by the Equations (2) and (3).

Figure 3:
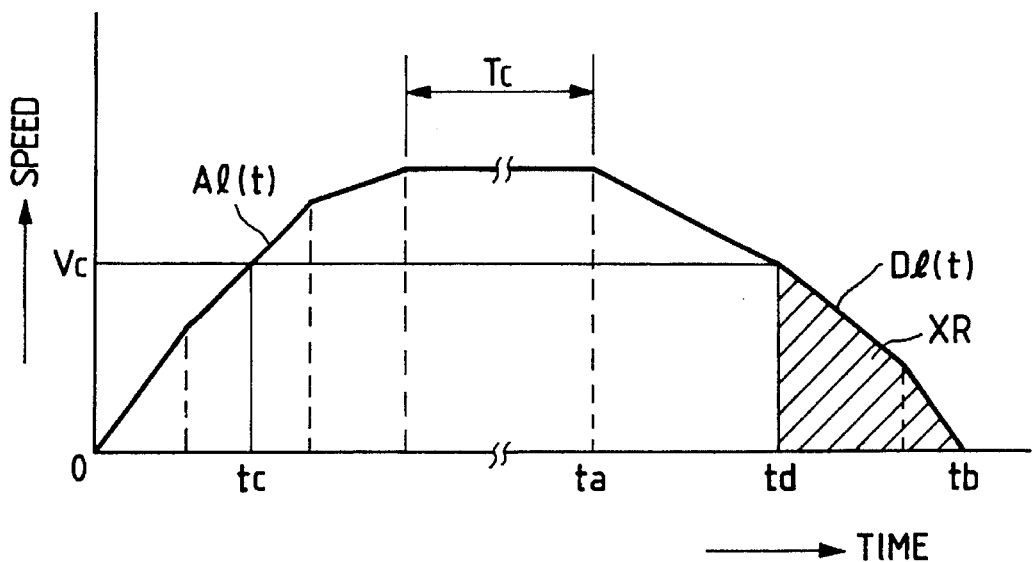
FIG. 3 is a view for explaining how to obtain the residual distance according to one preferred embodiment of this invention.

At the next step, the way of obtaining the residual distance XR is to be explained with reference to FIG. 3. The acceleration function and the deceleration function can be obtained by Equation (2) and Equation (3), respectively, but when obtaining the residual distance XR, there exists a constant speed block Tc in the pattern showing the speed characteristics as given in FIG. 3. The times ta and tb of the deceleration function can not be fixed because of the presence of this constant speed block Tc. Therefore, the speed Vc at the time tc during an acceleration will be obtained from the acceleration function AL(t), and will be used as a basis to compute the time td on the assumption that the deceleration function DL(t)=Vc. Accordingly, the area (which is the integrated value of the deceleration function and is the shaded area in FIG. 3) from the stop time tb (namely DL(t)=0) to the time td (namely DL(t)=Vc) can be determined, that is to say, the residual distance XR can be obtained.

The residual distance XR must be known in order to stop the servo motor at a stipulated position. In other words, the speed commanding output will be stopped only after considering the residual distance XR.

The residual distance XR may be computed using the function whenever the time changes. However, there may be unacceptable delays in obtaining the residual distance due to the time required for computation. Accordingly, it also is acceptable to previously calculate the residual distance XR in response to the speed at every sampling time during the acceleration and to store those values in a memory so that the residual distance XR may be obtained directly from memory in response to a given speed value.

Figure 4A:
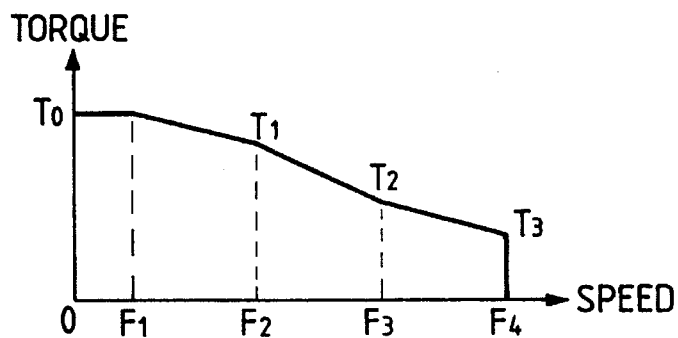
FIGS. 4(a) to 4(c) are views for explaining the acceleration/deceleration functions to be used for one preferred embodiment of this invention.

Next, the examples other than that given in FIG. 2 will be explained as possible acceleration/deceleration functions that can be used. A constant torque may be adopted for simplifying the function because the torque is larger at a lower speed, and the other speed regions may be connected by a plurality of straight lines as shown in FIG. 4(a). In this case, the acceleration function at a constant torque region is expressed by the following equation:

$$A(t) = T_0/W \quad (4)$$

while the acceleration/deceleration functions at higher speeds are identical to Formulae (2) and (3).

Figure 4B:
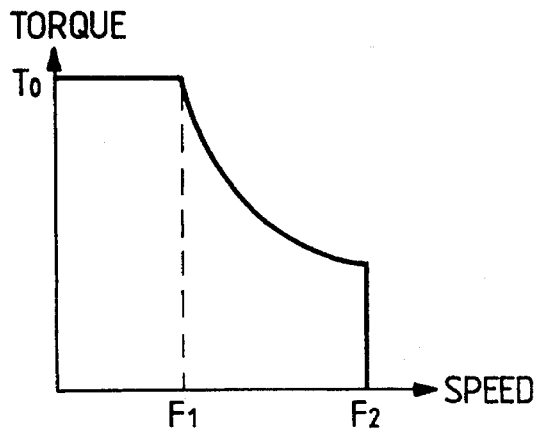

Further, consider the case where the low speed region is at constant torque $T_0$, as shown in FIG. 4(b), and the higher speed region is approximated with a hyperbola and is considered as another torque speed curve. The acceleration function, in this case, is defined by Formula (4) in the constant torque region, and the acceleration function in the hyperbola region can be expressed by the following equation:

$$A(t) = F1 \times \sqrt{2(t/t1) - 1} \quad (5)$$

F1=F(t1) Ti: time at speed F1.

Figure 4C:
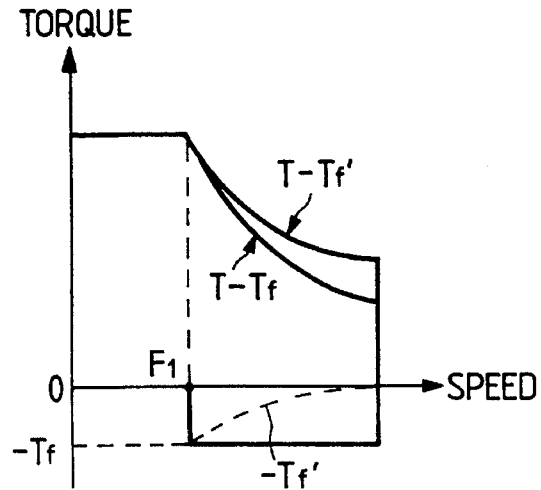

Moreover, as shown in FIG. 4(c), it is permitted to use a torque which is based on the subtraction of a constant frictional torque Tf or a torque which is based on the subtraction of an approximated frictional torque Tf that is decreasing as a function of speed.

Figure 5:
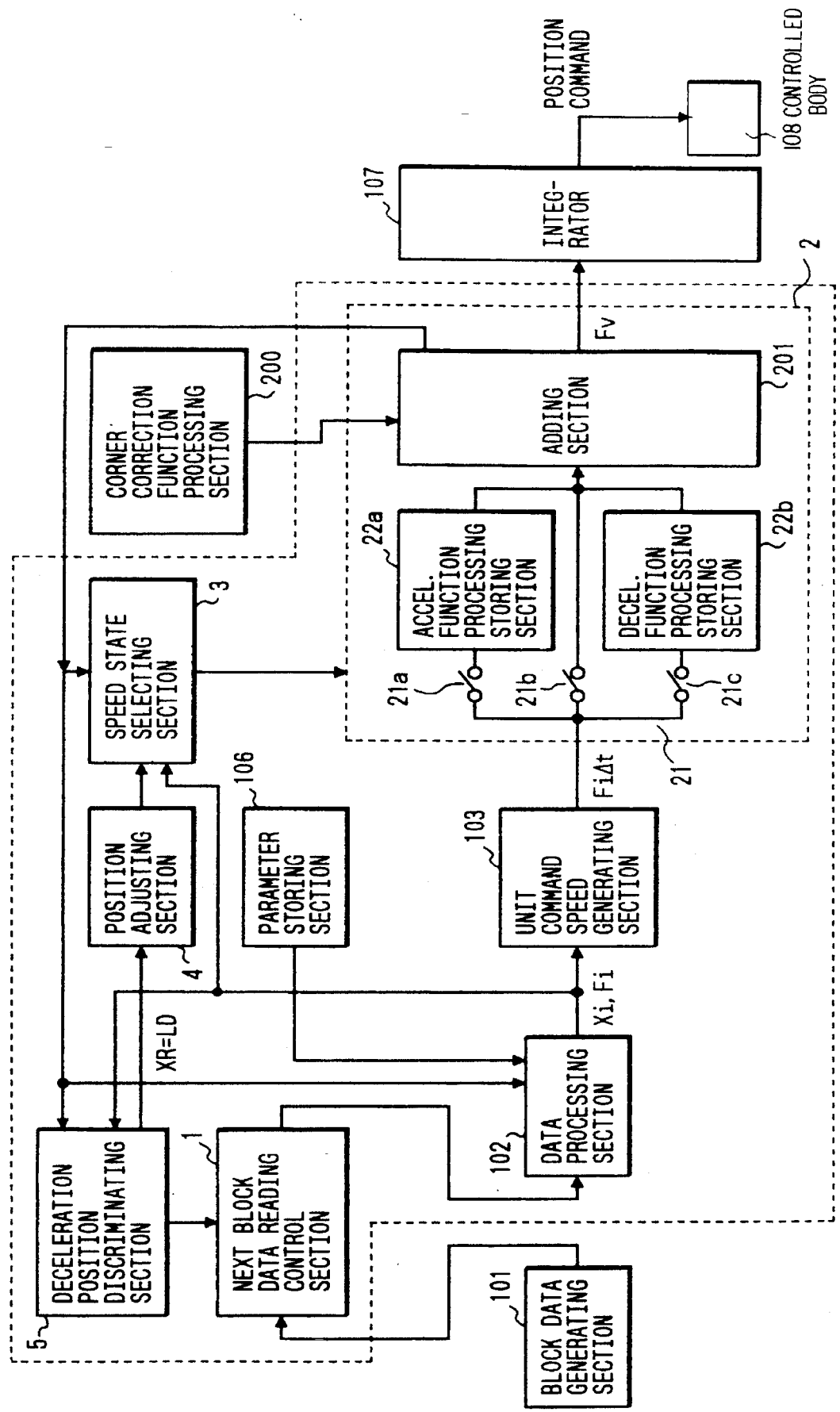
FIG. 5 is a block diagram showing one preferred embodiment of the present invention.
Figure 6:
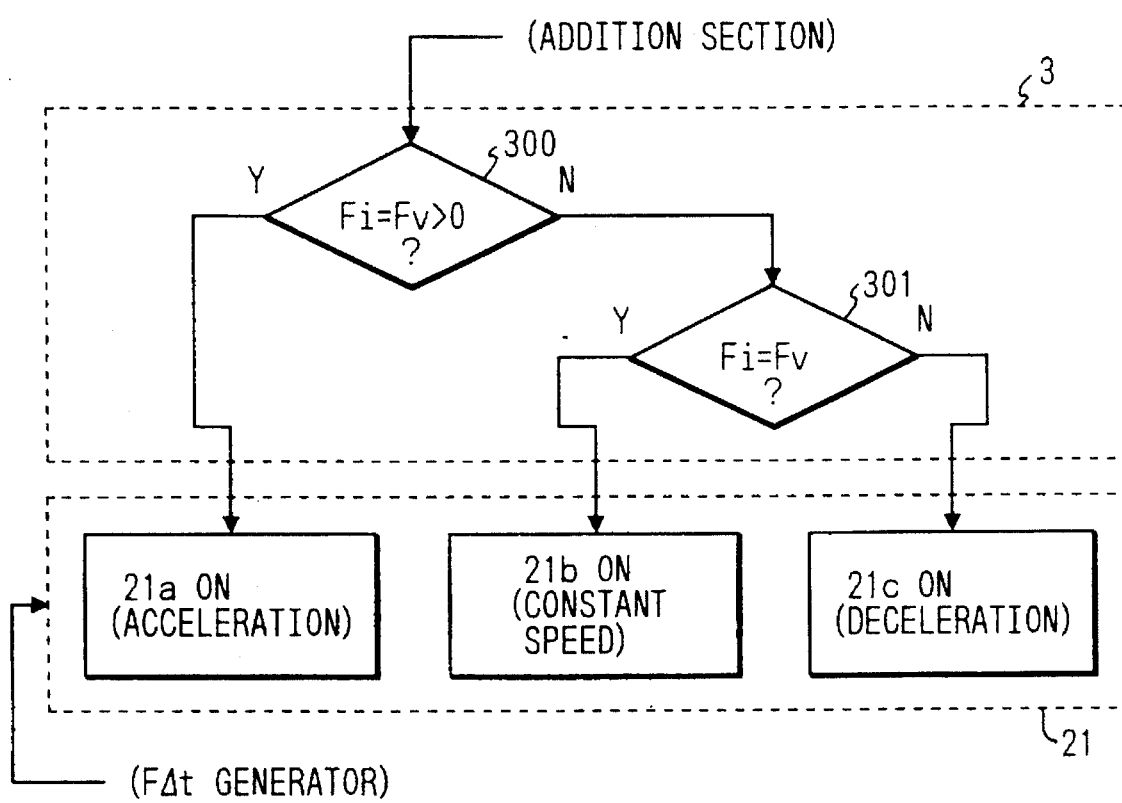
FIG. 6 is a view showing the function switching section according to one preferred embodiment of this invention.

Next, a preferred embodiment of the unit according to the present invention for implementing the method of the present invention can be explained in connection with FIG. 5. In FIG. 5, a speed state selecting section 3 is operative to activate one of three switching devices (21a, 21b, 21c) in the switching unit 21 building up the acceleration/deceleration controlling circuit 2, in accordance with the flow chart shown in FIG. 6. That is to say, the speed data Fi from the data processing section 102 (to be described later) is compared with the output speed Fv from the addition section 201 (to be described later) by the judgement section 300 in the speed state selecting section 3. The switching device 21a is turned ON for its acceleration function if Fi>Fv. Alternatively, the presence of Fi=Fv is judged by the judgement section 301 in the speed state selecting section 3 if Fi<Fv. The speed state selecting section 3 will turn ON the switching device 21b for its constant speed function if the judgement section 301 judges Fi=Fv, and the switching device 21c will be turned ON for its deceleration function if the state selecting section 3 judges Fi≠Fv. Position Command signals, based on the output speed signal Fv, are provided to a controlled body 108 to control movement of the controlled body accordingly.

Figure 11:
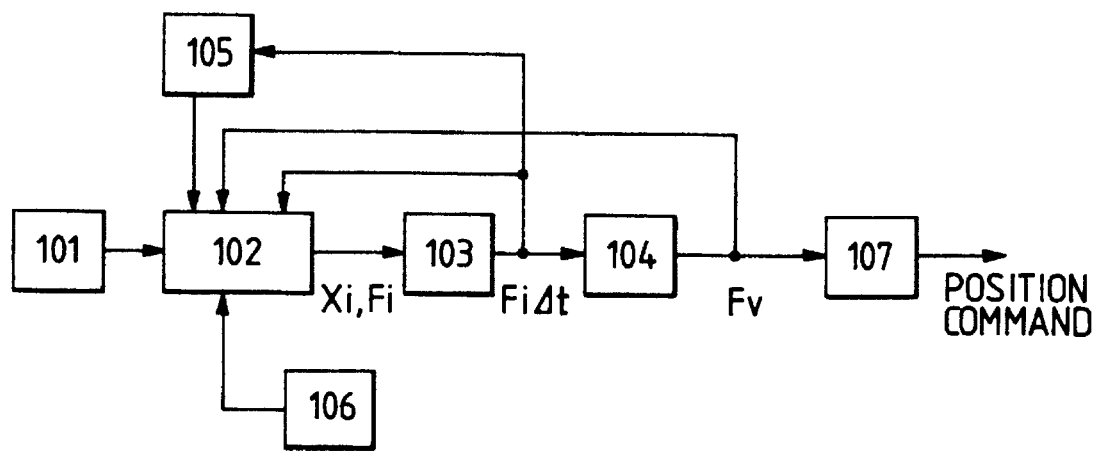
FIG. 11 is a block diagram showing the conventional position commanding unit of servo motor.
Figure 13A:
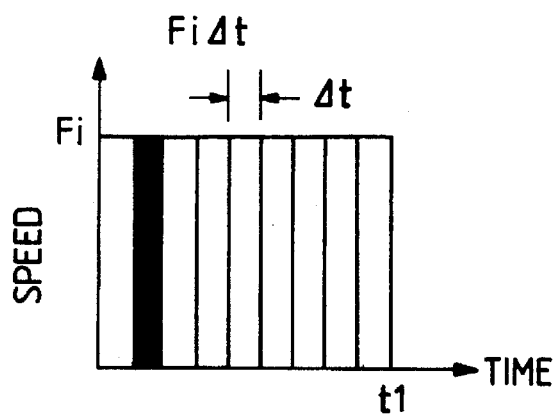
FIGS. 13(a) to 13(c) are views each showing the general speed pattern of prior art.
Figure 13B:
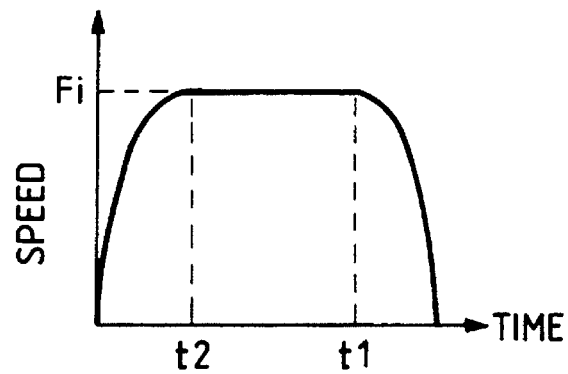
Figure 13C:
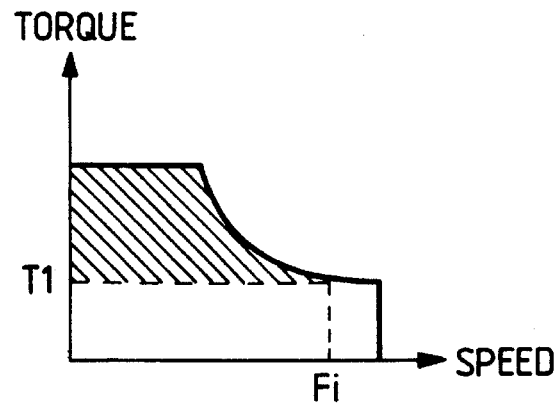
Figure 12:
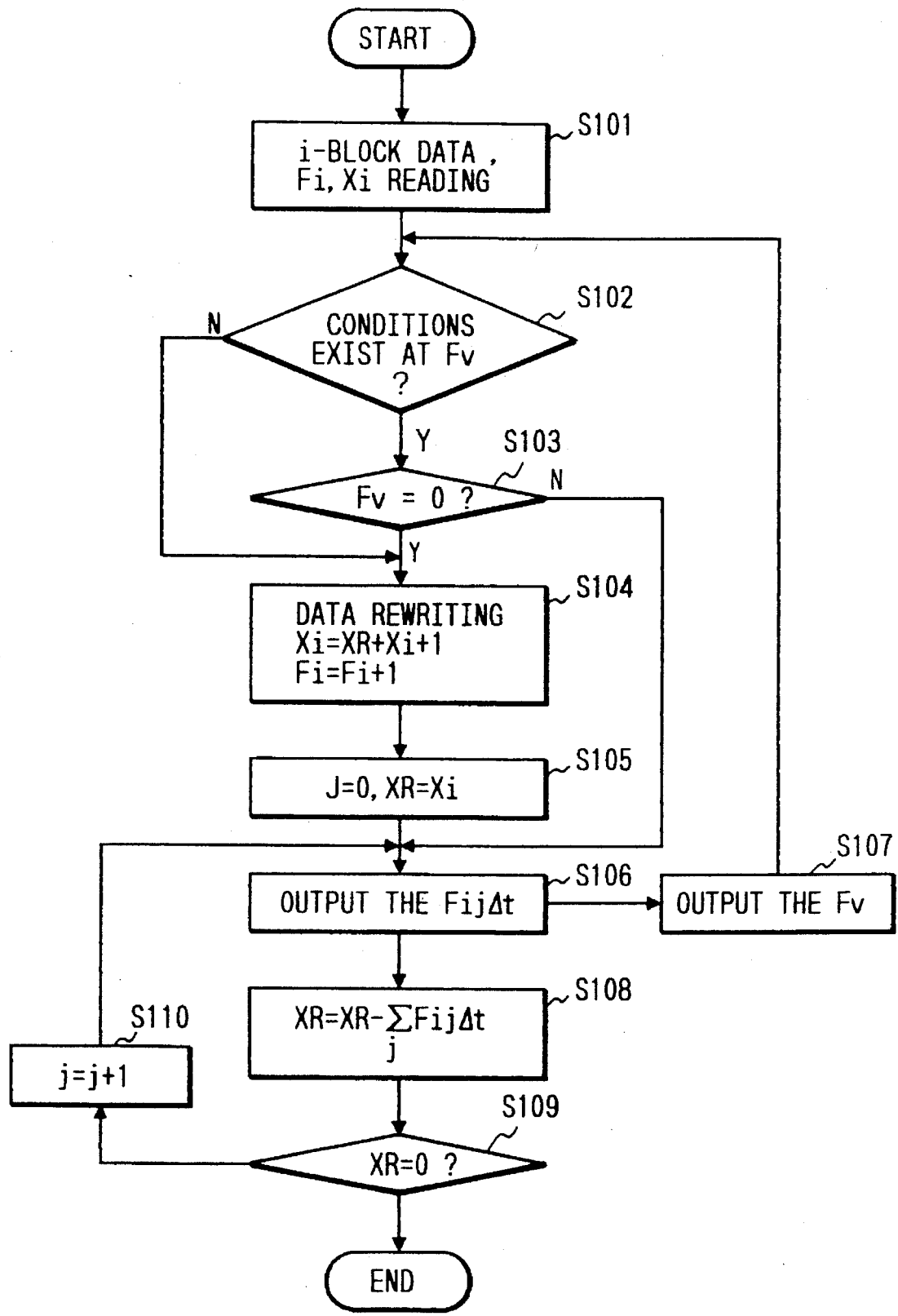
FIG. 12 is a flow chart explaining the actuation of conventional position commanding unit.
Figure 14:
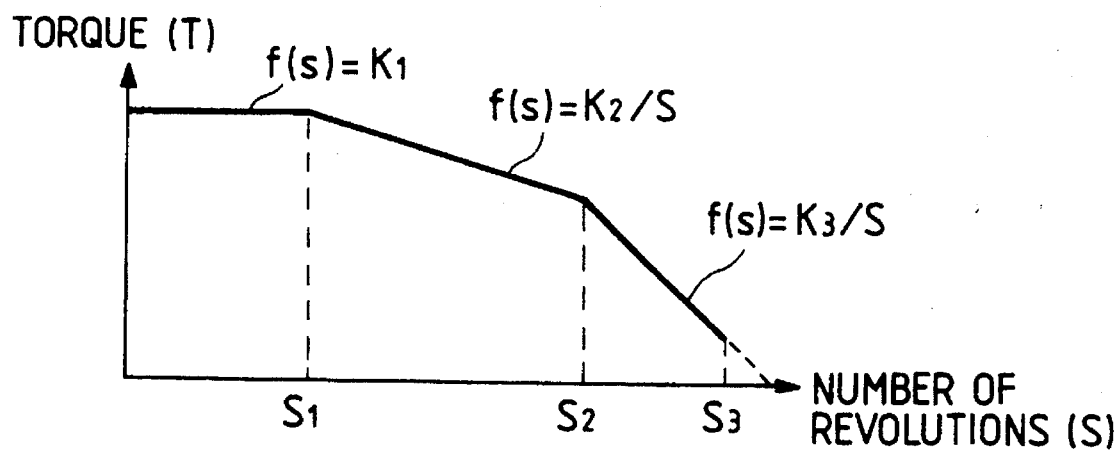
FIG. 14 shows the torque revolution (speed) characteristics disclosed in Unexamined Patent Publication (Kokai) No. 3-117514.
Figure 15:
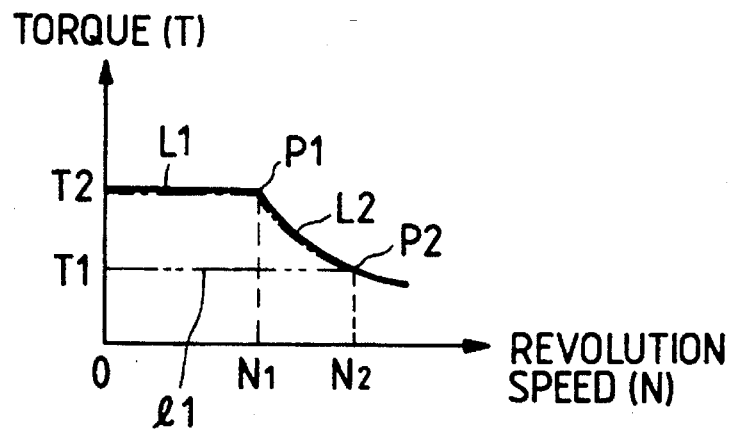
FIG. 15 shows the torque revolution (speed) characteristics disclosed in Unexamined Patent Publication (Kokai) No. 64-72206.

Moreover, the data processing section 102 is operative for controlling the data rewriting period, a position adjusting circuit 4 is used for correcting the position command during the deceleration, and a next block data reading control section 1 is used for reading the next block of data from the program 101. A deceleration position discriminating section 5, which includes the table from which the deceleration stop distance LD against the output speed Fv can be obtained, also has the function capable of computing the residual distance XR (XR=Xi−ΣFi·Δt) from the position data Xi and the speed data Fi. Further, the acceleration and deceleration function processing/storing sections 22a and 22b, respectively, are operative within the acceleration/deceleration controlling circuit 2 such that several necessary functions that correspond to the output speed Fv that may be selected. A plurality of acceleration functions are incorporated into the function processing/storing section 22a, and a plurality of deceleration functions are incorporated into the function processing/storing section 22b. The remaining sections in FIG. 5 are identical to those explained in FIG. 11; accordingly, they have identical reference numbers and their explanation is omitted.

The position data Xi and the speed data Fi are input from the data processing section 102 to the unit command speed generating section 103, and section 103 generates and outputs successively a travel distance Fi·Δt during the sampling period Δt. The travel distance is input into the acceleration/deceleration control circuit 2. The three switching devices 21a, 21b and 21c are included in the acceleration/deceleration control circuit 2, and the switching device 21a is turned ON when the output speed Fv is smaller than the command speed Fi, resulting in acceleration on the basis of the acceleration function A(t) from function storing section 22a in response to the output speed Fv. The switching device 21a is opened and the switching device 21b is closed when the output speed Fv has reached the command speed Fi, and a constant speed Fi is output. The position data Xi is subtracted by the output distance, and continues to output a constant speed Fi until the residual distance at that time coincides with the deceleration stop distance LDj at the command speed Fi. When the relation of residual distance XR=deceleration stop distance LDj is reached, the switching device 21b is turned OFF and the switching device 21c is closed so that the object controlled will decelerate and stop along the deceleration function D(t) stored within function storing section 22b.

Generally, the subsequent data are available and so the position data X(i+1) and the speed data F(i+1), which are read into the data processing section 102 via the next block data reading control section 1 at the point of time when the residual distance XR equals to the deceleration stop distance LDj, are used by section 102 to make a judgement to check whether there is a rewritable state or not on the basis of the information of parameter storing section 106. If the rewritable state is available, the data processing section 102 adds the residual distance XR, namely sets the position data Xi to "XR+Xi+1" and the speed data Fi to "Fi+1", and the acceleration, deceleration or constant speed is selected against these new position data Xi and speed data Fi.

When the data processing section 102 determines that (Residual distance XR–Deceleration stop distance LDj)<Fv·Δt on the basis of the parameters from parameter storing section 106, and the position data Xi+1 and the speed data Fi+1 at the next block is read, data processing section 102 makes a judgement to check if the data is in the state that can be processed as execution data. For example, if the read position data Xi+1 is added immediately to the residual distance XR, and if the read position data X(i+1) is a negative polarity, namely in retrogression, the residual distance XR and the position data Xi+1 are to be mutually crossed out, and are to be returned beforehand at the distance of twice the residual distance, namely a distance corresponding to 2 XR. Whether or not this 2 XR is within the permissible value needs to be determined by the data processing section 102.

In addition, even if the positive polarity, namely, the next block data Xi+1 also advances continuously in the same direction, the data needs to be rewritten after confirming that the speed has decelerated down to the speed previously set by the parameter in order to stop it once at the positioning point or to enter the orbit position within the tolerance. This rewriting is performed by the data processing section 102.

Figure 7:
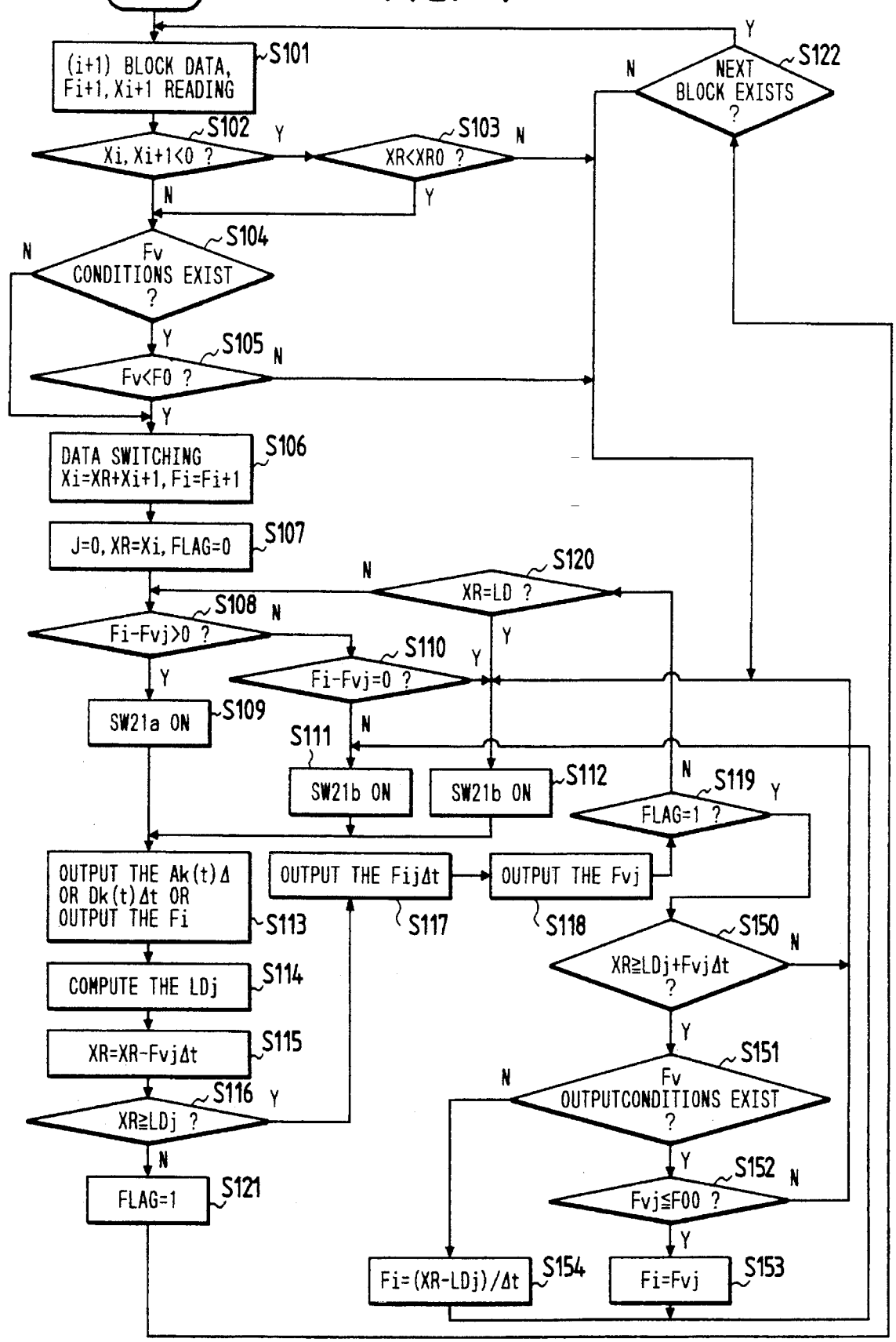
FIG. 7 is a flow chart explaining the actuation of one preferred embodiment of this invention.

One preferred embodiment of the unit according to the present invention, which puts in practice one aspect of this invention, has thus far been explained. However, now its actuation will be explained on the basis of the flow chart in FIG. 7.

Initially, the unit will check to see if the block data reading control section 1 has read the next data Fi+1 and Xi+1 from Program 101 (S101). It also will determine if the data polarity is opposite to the data currently being processed by the data at S102, namely whether the data is returning data. If it proves to be returning data, the unit makes a check to see if the residual distance XR is smaller than the stipulated value XRO stored previously into the parameter storing section 106 at S103, and move to S104 if it proves to be smaller. If there is any data in the identical direction at Step S102, the step proceeds to S104, makes a check to see if the output speed Fv covers the stipulated value stored previously into the parameter storing section 106. If there is the stipulated value stored into the parameter storing section 106, the output speed Fv makes a check to see if the stipulated value is smaller than its stipulated value FO at Step S105, and if the former value being smaller than the latter value, the step shifts to S106 to rewrite the data.

Next, j is set to zero, the residual distance XR to the position command data Xi and initially set the flag=0 at S107. Then, a check is made to see at S108 whether or not the command speed Fi is higher than the output speed Fvij. If it is higher, select the acceleration function at S109, and if it is lower, check to see at S110 if the command speed Fi is equal to the output speed Fvij, and if it is equal, output the command speed, as it is, at S111, and if it is not equal, select the deceleration function at S112 and move to S113. At S113, compute and output the travel distance Fi(t)·Δt per unit time on the basis of the acceleration function or the deceleration function on the basis of the command speed Fi(t) corresponding to the time t. Compute the deceleration stop distance LDj at every point of time using the acceleration function and deceleration function at S114 and the residual distance XR at S115, and check to see at S116 if the residual distance XR is larger than the deceleration stop distance LDj, and if it is larger, output the Fi(t)·Δt at S117, output the speed Fvj at S118, and move to S120 unless the flag should be 1 at S119 to check to see if the residual distance XR equals to the deceleration stop distance LDj, and if it is not equal, return to S108 and continue the acceleration or the constant speed. If it is equal, move to S112 and decelerate the speed. If the residual distance XR is smaller than the deceleration stop distance LDj at S116, the step proceeds to S121, makes the flag equal to 1, makes a check to see if the data of next block is available at S122, and if the data of next block is available, the step returns to S101 to read the data. If the data is not available, the step proceeds to S112 to continue the deceleration as it is.

In addition, if the flag proves to be 1 at S119, the step shifts to S150, makes a check to see if the residual distance XR is larger than the total of adding the travel distance Fi(t)·Δt in unit time at that time to the deceleration stop distance LDj, and if the former is smaller the latter, the step shifts to S112 for its deceleration, but if the former is larger than the latter, the step makes a check to see if there is any stipulated speed FOO that was previously set to the parameter storing section 106 at S151, and if there is no stipulated speed FOO, the step makes the command speed Fi(t)=(the residual distance XR–the deceleration stop distance LDj)/ the unit time Δt at S154 and then shifts to S111 to select a constant speed. If the designated value FOO has been set at S151, check to see if the output seed Fvj is smaller than the designated value F00, and if it is not smaller, shift to S112 and select the deceleration. If it is smaller, set command speed Fi(t) to the output speed fvj at S153, and shift to S111 to select the constant speed.

Here, S114 through S116, S120, S150 and S152 are conducted by the deceleration position discriminating section 5, S152 through S153 by the position adjusting circuit 4, S108 through S112 by the speed state selecting section 3 and the acceleration control section 2, and the other steps are done by the data processing section 102.

Next, the processing of the command speed Fi(t)=(the residual distance XR–the deceleration stop distance LDj)/ the unit time Δt is to be explained with reference to FIGS. 8(a)–(d). The position adjusting circuit 4 in FIG. 5 is a circuit for correcting the position command during deceleration, and this function has a high practical application value when using a digital control, and FIGS. 8(a)–(d) are explanatory drawings of the principle of this function. That is to say, the control is obtained by time division, which results in the continuous transmission of the command of distance advancing at the sampling time Δt, namely the FiΔt from the position command Xi. However, the deceleration stop distance is LD and kFiΔt {the shaded area of FIG. 8(a), for 1>k>0} is left over as shown in FIG. 8 (a). Thus, when the command of FiΔt is output once again, the necessary residual distance XR becomes insufficient and the deceleration stop becomes impossible. Therefore, when the relation of (Residual distance XR−Deceleration stop distance LD)<FiΔt is obtained as shown by the deceleration position discriminating section 5, the operation shifts to deceleration. Thereby, the speed gradually falls down and the FiΔt becomes smaller, but the value of (Residual distance XR−Deceleration stop distance LD) decreases together with the residual distance XR and the deceleration stop distance LD. Consequently, the relation of (Residual distance XR−Deceleration stop distance LD)<FiΔt is reversed, namely>or=FiΔt at a speed lower than kFi because the difference maintains the existence of the area of kFi·Δt, i.e., the shaded portion of FIG. 8(a).

Assuming that this operation occurred at the j-th processing, then the value on the acceleration/deceleration curve is not used at this j-th processing but is reserved as the value at the next point of time. Thus, instead, the command corresponding to the shaded area is output.

Figure 8A:
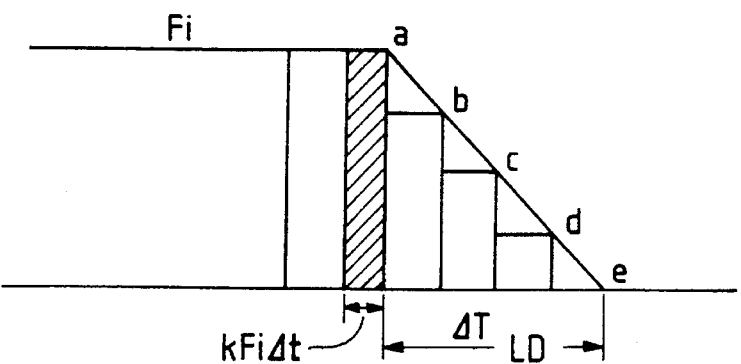
FIGS. 8(a) to 8(d) are explanatory diagrams each showing the principle of position adjusting circuit being used to an embodiment of the present invention.
Figure 8B:
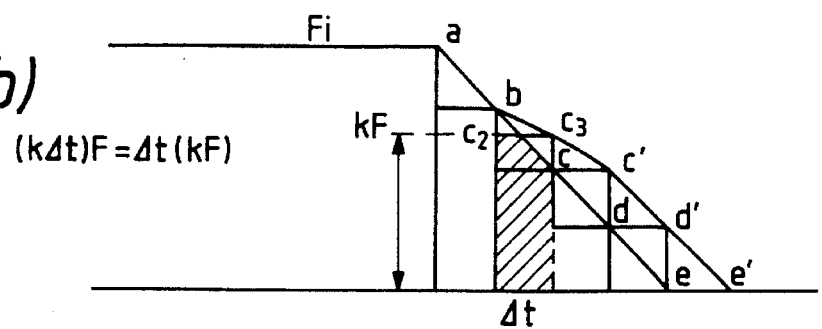

In short, with reference to FIG. 8(b), the shaded area defined by C2 and C3 is interrupted between b and c. The constant speed side switching means 21b of the acceleration/deceleration controlling circuit 2 is turned on when this signal is at C2 and C3, and the data on the deceleration curve is maintained. Then, the data is output when the deceleration side switching means 21c is turned on, and thereafter, the deceleration command is output along the deceleration curve.

Figure 8C:
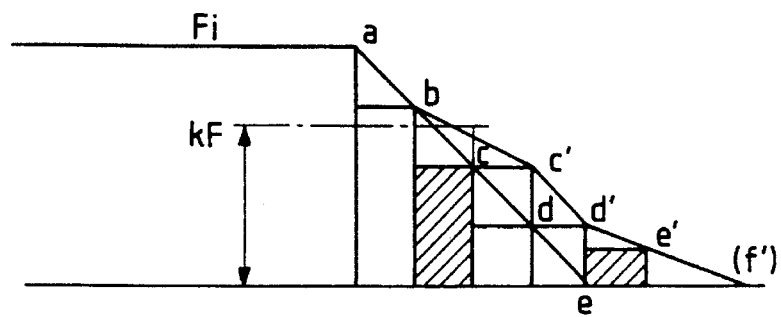

FIG. 8(c) is almost identical to FIG. 8(b), and shows the case of using only the speed F at the sampling point of time depending on the type of processing, and the error that slightly remains at the final step is to be corrected unless the difference of (Residual distance XR−Deceleration stop distance LD) should coincide with the speed F just at the sampling point of time.

Figure 8D:
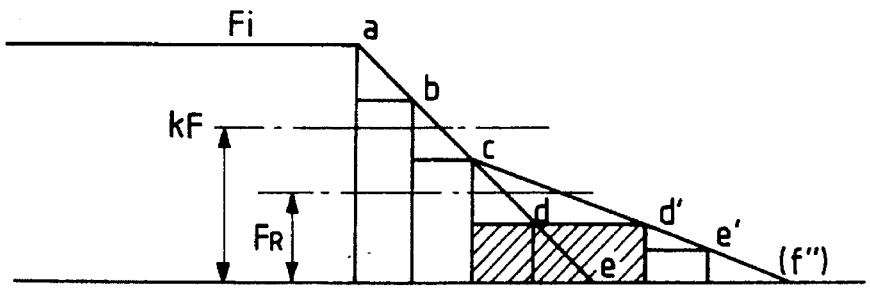

FIG. 8(d) is another example where there is a restriction on the output speed. This approach would be used if it is not desirable to cause a protrusion at a high speed, which is in the shape as described above of acceleration/deceleration curve. In this case, a constant speed is to be output for the duration of plural pieces of Δt time depending on the kind of speed.

The positional error caused during the deceleration start is to be corrected when the speed during the deceleration has reached the kFi, but when the error is again raised by the data of next block in the midway of deceleration, the error is carried over to the next block and an error is formed. In preparation for it, the speed must be decelerated down to a predetermined speed where the relation of kF·Δt<ε is maintained.

When driving an object with the servo motor, the load torque such as friction and the like is subtracted from the maximum torque being generated by the servo motor, and in further consideration of the transmission efficiency at the drive mechanism, the acceleration/deceleration curve is determined from the effective acceleration/deceleration torque. However, because the load torque is smaller in general, the torque after giving a certain margin (to be multiplied by the coefficient k, where 0<k<1) to the motor generated torque can be considered to be an effective acceleration/deceleration torque. This effective torque portion shall as a rule be constituted by an approximate function and then is integrated. If there are additional conditions such that the change of acceleration is smooth, those conditions are added to form an acceleration/deceleration curve.

Some main spindle synchronous operations require no accurate positioning. That is because the relative position at the drive from both the ends is taken as a problem in the rotary motion. In this case, the acceleration/deceleration curve alone needs to be considered and the position for ending the deceleration is problem-free.

As described above, when utilizing the torque to the maximum extent, the acceleration function or the deceleration function is determined, and the cross point from the acceleration to the constant speed and from the constant speed to the deceleration or the cross point in the reverse case is not smooth.

When the cross point is not smooth, the speed changes suddenly at that cross point and a shock may appear. To solve this problem, this preferred embodiment is provided with a correction, namely means for corner correction.

With reference to FIG. 5, a corner correction function processing section 200 and an addition section 201, which adds the output of corner correction function processing section 200 to the outputs of function storing sections 22a and 22b, are provided.

The corner correction structure can be understood with respect to FIG. 9, which is a view for explaining the computation method of corner correction function and illustrate an acceleration curve (function) A(t), a constant speed Fc and a corner function C(t) consisting of an arc. For the convenience of explanation, a circle is used as the corner function in the figure, but the shape should not be limited to this circle alone.

The acceleration function A(t) and the constant speed Fc have a cross point at the time t11' unless it should be corner-corrected. Suppose the angle as 74', which is formed by a tangent line at the time t11' of acceleration function A(t) and a constant speed Fc. The corner function with its radius being r will contact the acceleration function at the time t10 and comes in touch with the constant speed at the time t12.

First, assume that an angle θ is formed by a tangent line of corner function at the time t10 and a constant speed Fc, and the cross point of this tangent line and constant speed as t11. Also, regard the time t11' and the time t11 to be the same and suppose tan θ=m=tan θ'. As a result, the corner function at this time can be expressed by:

$$C(t) = Fc - \Delta Ta \times \{1 + \sqrt{(m^2+1)}\,\}/m) + \sqrt{[(m^2+1)\{1+\sqrt{(m^2+1)}\,\}^2 \Delta Ta^2/m^2 - (t-t10-\{1+\sqrt{(m^2+1)}\,\}\Delta Ta)^2]} \quad (6)$$

Referring to FIGS. 9(a) to 9(d), when Fc=A(t−t'11), t=t'11, and if t=t'14, Fc=D(t−t'14)= D(t'14−t).

m=|(dA(t−t'11)/dt)t=t'11−ΔTa| - - - Funk A $m=|(dA(t'14-t)/dt)t=t'11-\Delta Ta|$ --- Funk B
$m=|(dD(t'14-t)/dt)t=t'14+\Delta Ta|$ --- Funk C
$m=|(dD(t|t-11)/dt)t=t'11+\Delta Ta|$ --- Funk D Here, the Δ Ta is the time which is preset to the parameter storing section 106.

Equation (6) is the corner function when shifting to the constant speed from an acceleration, which can be represented as:

$$\text{Funk A}(t-t10)=C(t) \quad (7)$$

Similarly, the following equation can be used the corner function shifting to a deceleration from the constant speed:

$$\text{Funk B}(t)=\text{Funk A}(t15-t) \quad (8)$$

$$XR(t13)-LD(Fc)-Fc\Delta Tb<Fc\Delta t \ (\Delta Tb=m\Delta Ta)$$

$$XR(t13)<LD(Fc)+Fc(m\Delta Ta+\Delta t)$$

where XR(t13) represents XR at time T13 and LD(Fc) represents LD at speed Fc.

On the basis of these two equations, the following equation can be used as the corner function shifting to an deceleration from a constant speed:

$$\text{Funk C}(t)=2 \ Fc-\text{Funk A}(t-t10) \quad (9)$$

and the following equation can be used as the corner function shifting to an acceleration from a constant speed:

$$\text{Funk D}(t)=2 \ Fc-\text{Funk A}(t15-t) \quad (10)$$

Figure 10:
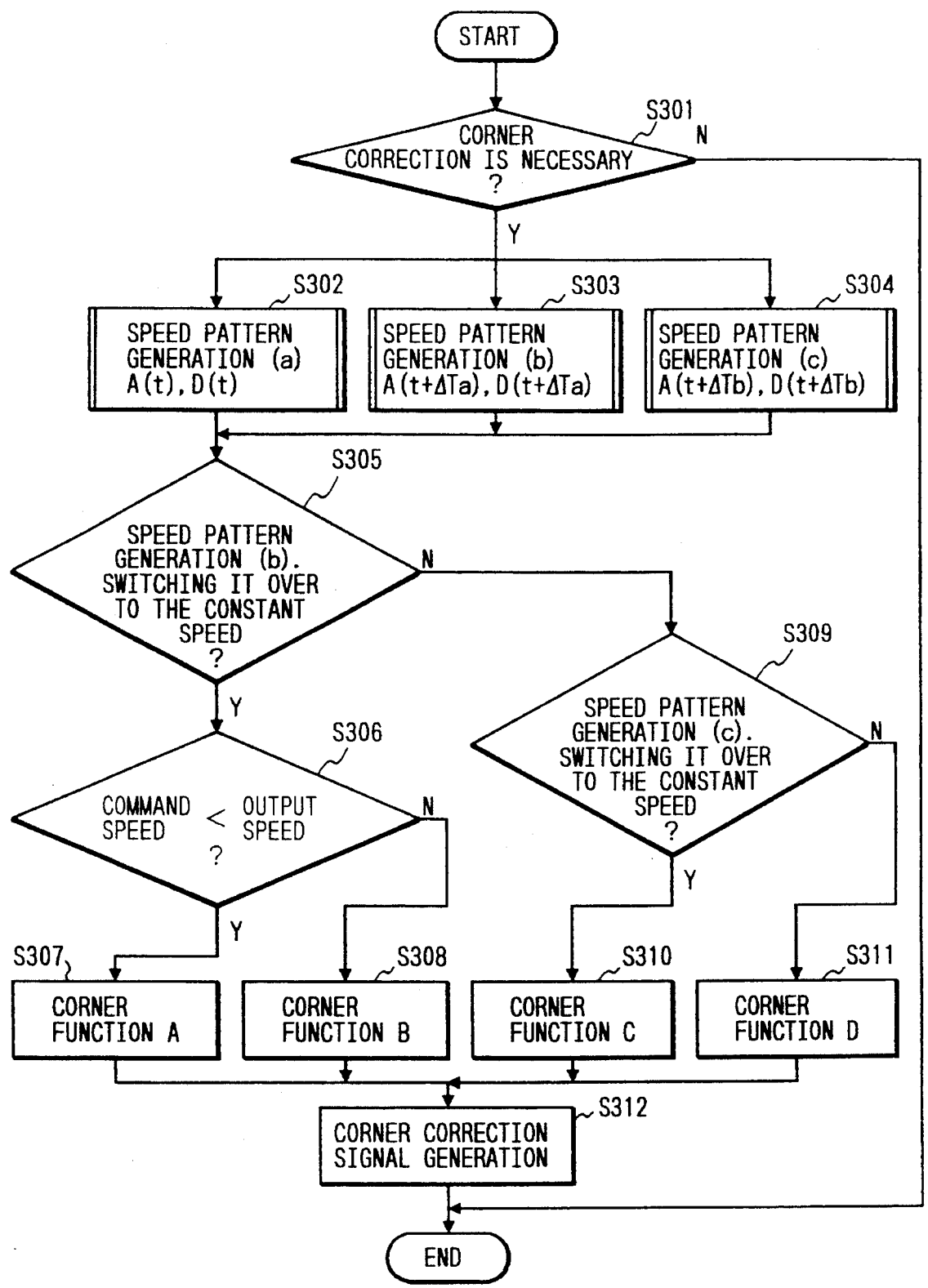
FIG. 10 is a flow chart explaining the corner correction actuation in one preferred embodiment of this invention.

Next, the operation when performing the corner correction is to be explained with reference to the flow chart in FIG. 10. First, when performing the corner correction, prepare three speed pattern generating sections shown in FIG. 9(a). The first speed pattern generating section generates the speed pattern for inherently driving the motor, the second speed pattern generating section moves the speed pattern higher by ΔTa than the first speed pattern generating section, and the third speed pattern generating section moves the speed pattern higher by ΔTb than the first speed pattern generating section.

If the corner correction is unnecessary at S301, the speed pattern shown in FIG. 9(a) shall be generated as it is, and if the corner correction is required, the step should proceed to the sub-routines in S302 through S304. Steps S302, S303 and S304 perform the same actuation as the speed pattern generating section given in FIG. 9(a), S302 being the first speed pattern generating section for generating the speed pattern for driving a motor, S302 being the second speed pattern and S304 being the third speed pattern generating section. Whether the second speed pattern generating section has been switched over to the constant speed is checked at S305, and if it is switched over, the step advances to S306 and when the command speed is not smaller than the output speed, the corner function Funk A is generated at S307. If it is smaller, the corner function Funk B is generated at S308. Unless the second speed pattern generating section should be switched over to the constant speed at S305, the step shifts to S309, and if the third speed pattern generating section is switched over to the constant speed, the corner function Funk C is generated at S310. If it is not switched over, the corner function Funk D is generated at S311, and the step is completed after generating the corner correction signal at S312. This corner correction signal becomes the output signal of corner correction function processing section 200 in FIG. 5.

Although the example of obtaining the corner correction function through the computation has been explained in the above, the present invention should not be limited by this example, but can cover various kinds of design alterations because it is acceptable, for example, to correct the corner using the predetermined correction function when the stipulated speed is reached during the shift to the constant speed characteristics from the acceleration characteristics and moreover it is also acceptable to obtain the corner correction function by the combination with the case of obtaining the corner correction function through the computation as shown in the embodiment earlier mentioned.

According to the position commanding method and its unit of the present invention, the deceleration stop distance LD of output speed is computed at all times or is held as a list data as described above and moreover is compared with the residual distance XR. Consequently, the deceleration stop distance does not have to coincide with the residual portion from the acceleration command, and the acceleration/deceleration curve alone can be realized in an independent form. Therefore, because the acceleration curve can be separated easily from the deceleration curve, there is such an effect that the torque being generated by a controlled body can be utilized to the maximum extent.

Further, in accordance with another preferred embodiment of this invention, there is such an effect that the speed change can be made smoother by correcting the cross point of acceleration/deceleration curves of independent forms, namely the corner section of acceleration/deceleration curves.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A position commanding unit for a controlled body which is responsive to input speed and position data comprising:

unit command speed generating means for generating a command speed per unit time in response to said speed data and position data;

acceleration/deceleration controlling means for providing, in response to said command speed, an output signal representing a rate of acceleration, rate of deceleration or constant speed, said acceleration/deceleration controlling means comprising:

function storing means for storing a plurality of acceleration functions and deceleration functions; and switching means for selecting, in accordance with said command speed, one of the following:

one of said acceleration functions to cause said acceleration/deceleration controlling means to provide said output signal representing a rate of acceleration;

one of said deceleration functions to cause said acceleration/deceleration controlling means to provide said output signal representing a rate of deceleration; and constant speed designation to cause said acceleration/deceleration controlling means to provide said output signal representing a constant speed;

a deceleration position discriminator, comprising;
 means for computing a distance required to stop said controlled body when decelerated at said rate of deceleration represented by said output signal;
 means for calculating, in accordance with said position data, a residual distance away from a position at which said controlled body is to stop; and
 means for outputting a coincidence signal when said deceleration stop distance coincides with said residual distance; and
controlled body decelerating means for, in response to said coincidence signal, decelerating the controlled body at a rate corresponding to said rate of deceleration represented by said output signal.

2. A position commanding unit as claimed in claim 1, further comprising:
 means for representing deceleration torque characteristics of said controlled body as a continuous broken line throughout a service speed range of a deceleration torque characteristic line of said controlled body by dividing the service speed range into a plurality of regions; and
 means for graphically representing the deceleration torque characteristics corresponding to each of the regions as straight lines.

3. A position commanding unit as claimed in claim 2, wherein said representing means divides said service speed range into said plurality of regions so that a high speed section on the deceleration torque characteristic line resembles a hyperbola.

4. A position commanding unit for a controlled body which is responsive to input speed and position data comprising:
 unit command speed generating means for generating a command speed per unit time in response to said speed data and position data;
 acceleration/deceleration controlling means for providing, in response to said command speed, an output signal representing a rate of acceleration, rate of deceleration or constant speed, said acceleration/deceleration controlling means comprising:
  function storing means for storing a plurality of acceleration functions and deceleration functions; and
  switching means for selecting, in accordance with said command speed, one of the following:
   one of said acceleration functions to cause said acceleration/deceleration controlling means to provide said output signal representing a rate of acceleration;
   one of said deceleration functions to cause said acceleration/deceleration controlling means to provide said output signal representing a rate of deceleration; and
   a constant speed designation to cause said acceleration/deceleration controlling means to provide said output signal representing a constant speed;
 a deceleration position discriminator, comprising:
  means for computing a distance required to stop said controlled body when decelerated at said rate of deceleration represented by said output signal;
  means for calculating, in accordance with said position data, a residual distance away from a position at which said controlled body is to stop; and
  means for outputting a coincidence signal when said deceleration stop distance coincides with said residual distance; and
 a data processing section for rewriting, in response to said coincidence signal, said speed data and position data as next speed data and next position data, said unit command speed generating means using said next speed data and next position data to generate a new command speed for controlling said switching section of said acceleration/deceleration controlling means using said next speed data and next position data.

5. A position commanding unit as claimed in claim 4, further comprising:
 means for representing deceleration torque characteristics of said controlled body as a continuous broken line throughout a service speed range of a deceleration torque characteristic line of said controlled body by dividing the service speed range into a plurality of regions; and
 means for graphically representing the deceleration torque characteristics corresponding to each of the regions as straight lines.

6. A position commanding unit as claimed in claim 5, wherein said representing means divides said service speed range into said plurality of regions so that a high speed section on the deceleration torque characteristic line resembles a hyperbola.

7. A position commanding unit for a controlled body which is responsive to input speed and position data comprising:
 unit command speed generating means for generating a command speed per unit time in response to said speed data and position data;
 acceleration/deceleration controlling means for providing, in response to said command speed, an output signal representing a rate of acceleration, rate of deceleration or constant speed, said acceleration/deceleration controlling means comprising:
  function storing means for storing a plurality of acceleration functions and deceleration functions; and
  switching means for selecting, in accordance with said command speed, one of the following:
   one of said acceleration functions to cause said acceleration/deceleration controlling means to provide said output signal representing a rate of acceleration;
   one of said deceleration functions to cause said acceleration/deceleration controlling means to provide said output signal representing a rate of deceleration; and
   a constant speed designation to cause said acceleration/deceleration controlling means to provide said output signal representing a constant speed;
 corner correction function processing means for correcting the speed change at a cross point of acceleration/deceleration functions consisting of plural combinations of said acceleration function, deceleration function and constant speed and providing a correction signal representative thereof;
 addition means for adding the output signal of said acceleration/deceleration controlling means to the correction signal of said corner correction function processing means to produce a corrected output signal;
 a deceleration position discriminator, comprising:
  means for computing a distance required to stop said controlled body when decelerated at said rate of deceleration represented by said corrected output signal;
  means for calculating, in accordance with said position data, a residual distance away from a position at which said controlled body is to stop; and means for outputting a coincidence signal when said deceleration stop distance coincides with said residual distance; and controlled body decelerating means for, in response to said coincidence signal, decelerating the controlled body at a rate corresponding to said rate of deceleration represented by said corrected output signal.

8. A position commanding unit as claimed in claim 7, further comprising:

means for representing deceleration torque characteristics of said controlled body as a continuous broken line throughout a service speed range of a deceleration torque characteristic line of said controlled body by dividing the service speed range into a plurality of regions; and means for graphically representing the deceleration torque characteristics corresponding to each of the regions as straight lines.

9. A position commanding unit as claimed in claim 8, wherein said representing means divides said service speed range into said plurality of regions so that a high speed section on the deceleration torque characteristic line resembles a hyperbola.

10. A position commanding method for generating commands for controlling a controlled body in response to input speed data and position data, comprising the steps of:

obtaining a command speed from said speed data and said position data;

obtaining an output speed of acceleration, deceleration or constant speed in response to said command speed;

obtaining a difference between said command speed and said output speed;

obtaining, in accordance with said position data, a distance required to stop said controlled body when decelerated at said output speed of deceleration, and a residual distance away from a position at which said controlled body is to stop; and decelerating said controlled body at said output speed of deceleration using a deceleration function responsive to said output speed in response to a coincidence signal indicating that said decelerating stop distance coincides with said residual distance.

11. A position commanding method as claimed in claim 10, further comprising the steps of:

representing deceleration torque characteristics of said controlled body as a continuous broken line throughout a service speed range of a deceleration torque characteristic line of said controlled body by dividing the service speed range into a plurality of regions; and graphically representing the deceleration torque characteristics corresponding to each of the regions as straight lines.

12. A position commanding unit as claimed in claim 11, wherein said representing step divides said service speed range into said plurality of regions so that a high speed section on the deceleration torque characteristic line resembles a hyperbola.

13. A position commanding method as claimed in claim 10, further comprising the steps of:

determining whether Command speed=(Residual distance−Deceleration stop distance)/Unit time; and adjusting said command speed so as to have the relation of:

Command speed≠(Residual distance−Deceleration stop distance)/Unit time when it is determined in the determining step that Command speed=(Residual distance−Deceleration stop distance)/Unit time.

14. A position commanding method as claimed in claim 10, further comprising the steps of:

dividing a service speed range on an acceleration/deceleration torque characteristic line of said controlled body into a plurality of regions;

making the acceleration/deceleration torque characteristics corresponding to each of said regions to be straight lines; and obtaining the acceleration/deceleration torque characteristics which become a continuous broken line throughout said service speed range.

15. A position commanding method as described in claim 14, wherein said dividing step comprises a step of dividing a service speed range on an acceleration/deceleration torque characteristic line of said controlled body into a plurality of regions, wherein a high speed section on said deceleration torque characteristic line has the acceleration/deceleration torque characteristics of a hyperbola.

16. A position command method for generating a control command for a controlled body in accordance with the difference between the command speed per time unit, obtained from input speed data and input position data, and an output speed of acceleration, deceleration or constant speed obtained in response to said command speed, comprising:

determining characteristic lines consisting of two combinations of any of the speeds of said acceleration, deceleration and constant speed;

determining a cross point of said characteristic lines;

obtaining a first stipulated point before reaching said cross point of characteristic lines and a second stipulated point after said cross point; and obtaining a correction function of speed change between said first stipulated point and said second stipulated point.

17. A position commanding method as claimed in claim 16, further comprising the steps of:

representing deceleration torque characteristics of said controlled body as a continuous broken line throughout a service speed range of a deceleration torque characteristic line of said controlled body by dividing the service speed range into a plurality of regions; and graphically representing the deceleration torque characteristics corresponding to each of the regions as straight lines.

18. A position commanding method as claimed in claim 17, wherein said representing step divides said service speed range into said plurality of regions so that a high speed section on the deceleration torque characteristic line resembles a hyperbola.

19. A position commanding method for controlling the acceleration/deceleration of a controlled body based on a command speed obtained from speed data and position data, comprising the steps of:

dividing a speed region into a plurality of regions, allocating a linear torque having a different slope to each of said speed regions, preparing a speed—torque curve where the torques of adjacent speed regions may become identical to each other, and controlling acceleration and deceleration of said controlled body in accordance with said speed—torque curve until said controlled body reaches said command speed.

20. A position commanding method as claimed in claim 19, further comprising the steps of:

representing deceleration torque characteristics of said controlled body as a continuous broken line throughout a service speed range of a deceleration torque characteristic line of said controlled body by dividing the service speed range into a plurality of regions; and graphically representing the deceleration torque characteristics corresponding to each of the regions as straight lines.

21. A position commanding method as claimed in claim 20, wherein said representing step divides said service speed range into said plurality of regions so that a high speed section on the deceleration torque characteristic line resembles a hyperbola.

* * * * *